INVENTORS.
Jay W. Reynolds
Herman J. Stripling, Jr.

ATTORNEY.

INVENTORS.
Jay W. Reynolds
Herman J. Stripling, Jr.

ATTORNEY.

INVENTORS.
Jay W. Reynolds
Herman J. Stripling, Jr.

ATTORNEY.

INVENTORS.
Jay W. Reynolds
Herman J. Stripling, Jr.

ATTORNEY.

INVENTORS.
Jay W. Reynolds
Herman J. Stripling, Jr.

ATTORNEY.

INVENTORS.
Jay W. Reynolds
Herman J. Stripling, Jr.

ATTORNEY.

United States Patent Office 3,372,276
Patented Mar. 5, 1968

3,372,276
METHOD AND SYSTEM FOR THE NON-DESTRUCTIVE INSPECTION OF VARIABLE DENSITY PLATES
Jay W. Reynolds, Oak Ridge, and Herman J. Stripling, Jr., Knoxville, Tenn., assignors to the United States of America as represented by the United States Atomic Energy Commission
Filed May 21, 1965, Ser. No. 457,881
15 Claims. (Cl. 250—83.3)

ABSTRACT OF THE DISCLOSURE

A plate, having a plurality of different required area densities, and a plurality of corresponding standards are automatically inspected in a plurality of incremental longitudinal passes of the plate and standards between a source of penetrating radiation and a detector therefor to thus effect an inspection of the major portion of the plate. The plate inspection involves injecting data from the standards into circuitry for comparison with data derived from the plate itself, with the result that plate areas which are out-of-tolerance are indicated on a chart recorder.

---

The basic concept of non-destructive inspection of articles for density variations by the use of a source of ionizing radiation such as an X-ray or gamma ray source and a suitable receiver, and by passing the article to be inspected between the source and receiver is known in the art. However, in the inspection of plates with several different area density requirements, such as reactor fuel plates, there exits a need to provide an inspection system which will rapidly and automatically inspect the different areas and provide a separate and different indication for each area which is out of tolerance. The present invention, as described below, provides an automatic inspection system to meet this need.

Therefore, it is a primary object of the present invention to provide a non-destructive system and method for automatically inspecting plates with several different area density requirements.

It is another object of the present invention to provide a non-destructive system and method for automatically inspecting plates as in the preceding object and for providing a different and separate indication for each area which is out of tolerance.

These and other objects and advantages of the present invention will become apparent upon a consideration of the following detailed specification and the accompanying drawings, in which like reference numerals refer to like parts, and in which.

The above objects have been accomplished in the present invention by placing the plate to be inspected on a plate holder of a carriage-type mechanism. A series of standards is also affixed to the plate holder and each is provided with a preselected area density corresponding to the required area density in each of several areas of the plate to be inspected. Duplicate standards are positioned at each end of the plate. Means are provided for the automatic longitudinal translation of the plate holder with incremental transverse movement at the end of each longitudinal stroke such that the major portion of the plate holder is inserted in a fixed pattern between a source of penetrating radiation and a detector therefor in order to determine the density of the several areas of the plate positioned on the holder. The plate inspection involves injecting data from the standards into circuitry for comparison with data derived from the plate itself, with the result that areas of out-of-tolerance are indicated on a chart in a manner to be more fully described below.

Figures 1, 5:
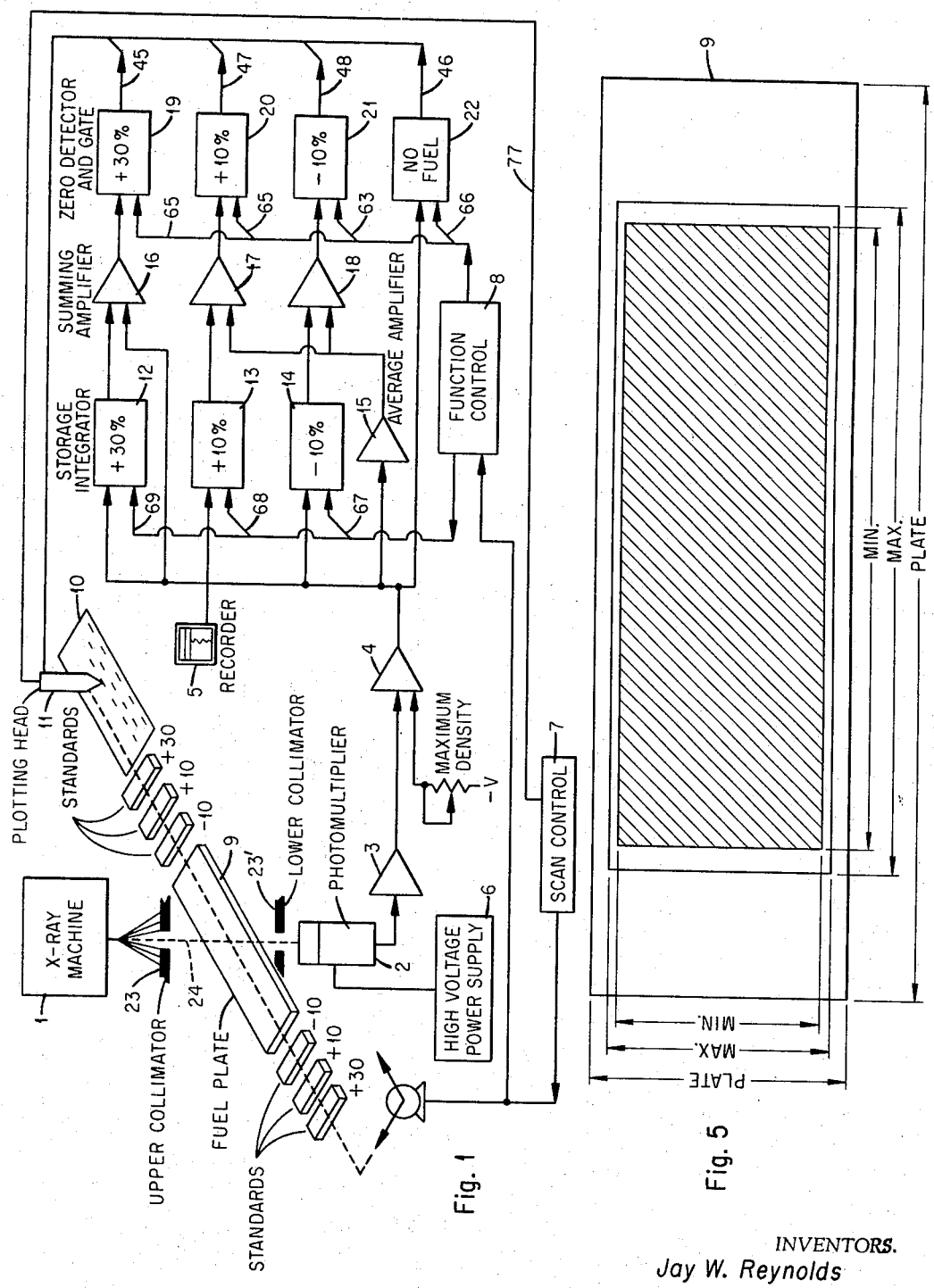
FIG. 1 is a block diagram of the plate scanner and inspection system of the present invention.
FIG. 5 shows a typical fuel plate for scanning by the system of FIG. 1.

The block diagram of the present system, illustrated in FIG. 1, shows the interconnections between the major portions of the circuitry. The plate 9 to be inspected and the various standards are positioned on a plate holder, not shown. The plotting head 11 is attached to the plate holder by means, not shown, such that the plotting head duplicates the movement of the holder both longitudinally and transversely, whereby the plotting head is selectively actuated in a manner to be described below to mark the plotting paper 10 when any area of the plate 9 is out of tolerance. The plotting paper 10 is stationary with respect to the movable plotting head 11.

A scan control unit 7, to be described below, is connected to a hydraulic means for longitudinal movement of the carriage mechanism supporting the plate holder and to an indexing motor means for transverse indexing of the plate holder. The scan control 7 also provides position control signals to a function control unit 8 to be described below.

An X-ray machine 1 provides for a source of X-rays which are collimated by the upper collimator 23 into a beam 24 which passes through the plate 9 under inspection. A phosphor which is coupled to a photomultiplier 2 receives the beam 24 after passing through the plate 9 and the lower collimator 23'. A power supply 6 supplies high voltage to the photomultiplier 2. The output of the photomultiplier 2 is connected to an amplifier 3 and the output of this amplifier is connected to a level shifting amplifier 4. The current at the summing junction of amplifier 4 is combined with an adjustable bucking current (maximum density) to cause an increase in density to result in an increase in signal. The output of amplifier 4 is connected to a recorder 5, to an average amplifier 15, to storage integrator circuits 12, 13, and 14, to a zero detector and gate unit 22 for checking the "no fuel" condition, and to a summing amplifier 16. The output of the storage integrator circuit 12 is also connected to the summing amplifier 16. The output of the summing amplifier 16 is connected as one input to a zero detector and gate unit 19. The output of the circuit 13 is connected as one input to a summing amplifier 17, and the output of the circuit 14 is connected as one input to a summing amplifier 18. The output of the average amplifier 15 is connected as the other input to summing amplifiers 17 and 18. The output of amplifier 17 is connected as one input to the zero detector and gate unit 20, and the output of amplifier 18 is connected as one input to the zero detector and gate unit 21.

The control signals from the scan control 7 effect a plurality of function control signals in the function control unit 8 and these function control signals are connected as the other inputs into the units 12, 13, 14 and the units 19, 20, 21, 22 in a manner to be described below. The outputs of units 19, 20, 21, 22 are connected by leads 45, 47, 48, 46, respectively, to solenoid valves which control air flow, not shown, on the plotting head 11 to control respective ink marking devices for marking on the paper 10, in a manner to be described below. The scan control unit 7 also provides a control signal over lead 77 to a left shift solenoid on the plotting head, not shown, for shifting the plotting head for the purpose to be described below.

The system of FIG. 1 can be used for inspecting any plate that has different areas with each area having a different density requirement. However, the present invention will be described for inspecting the fuel plates of a nuclear reactor and more particularly the fuel plates of a high flux isotope reactor. The fuel plate 9 of FIG. 1 is such a plate, for example, and the plate is checked for conformance with specified limits, no fuel, +30 spot, and ±10% average, in the three areas of the plate, no fuel area, maximum outline, and minimum outline of a typical fuel plate such as shown in FIG. 5.

The standards (+30, +10, and −10) shown at each end of the fuel plate 9 of FIG. 1 are machined from aluminum by the use of an empirically determined relationship between the uranium oxide of the fuel plates and aluminum. Depending on the particular type of plates being inspected, whether they be reactor fuel plates or other types of plates, various sets of standards can be used with a resulting change in tolerance limits. The zero detectors and gates of FIG. 1 are opened in the following combinations: no fuel, +30% and +10%, and +30% and ±10% for the no fuel, maximum outline, and minimum outline, respectively. Each of the out-of-tolerance signals opens a color channel, black, green, red, or blue, to the plotting head 11. Other color combinations are possible, if desired.

Figure 2:
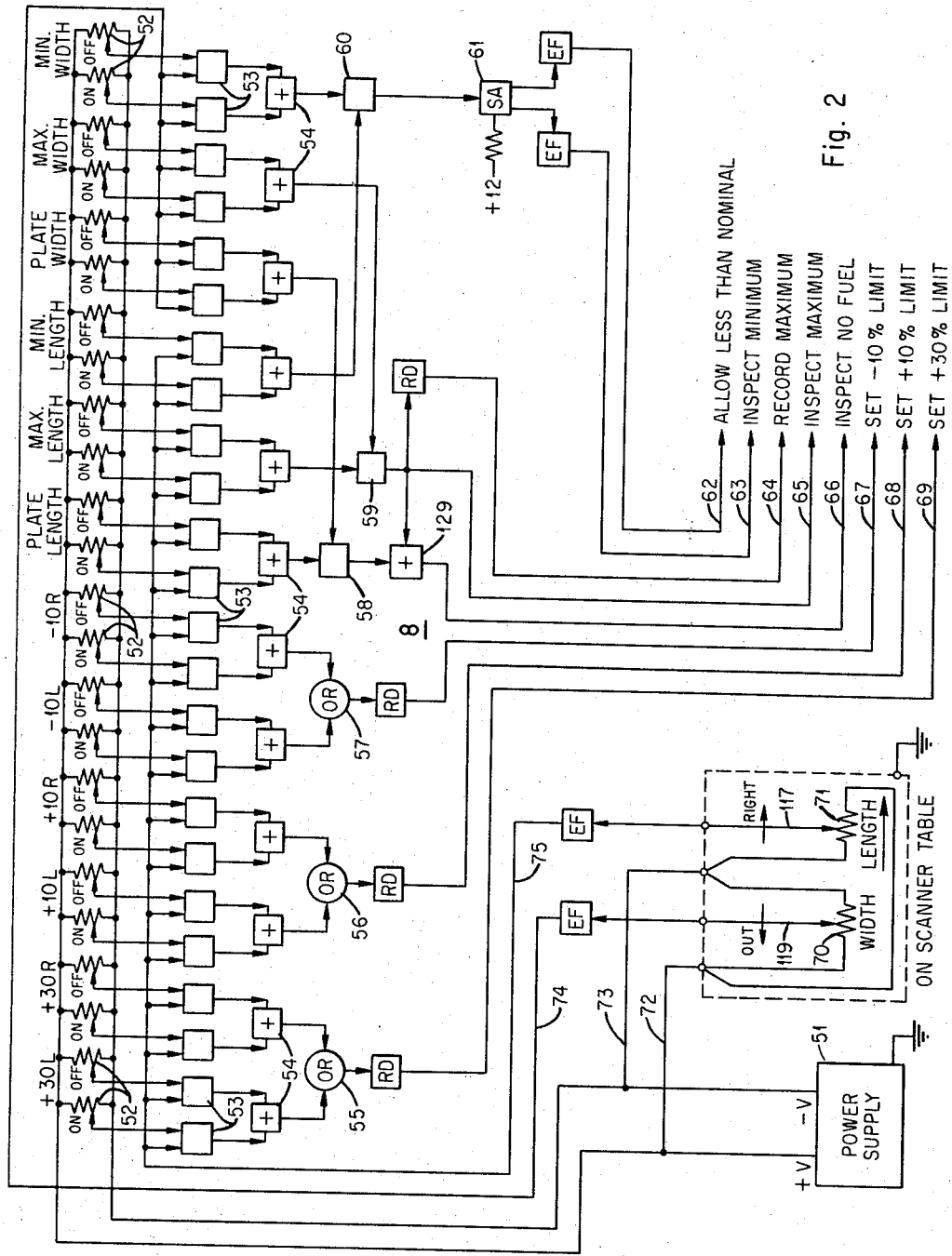
FIG. 2 is a wiring diagram of the function control of FIG. 1.
Figure 3:
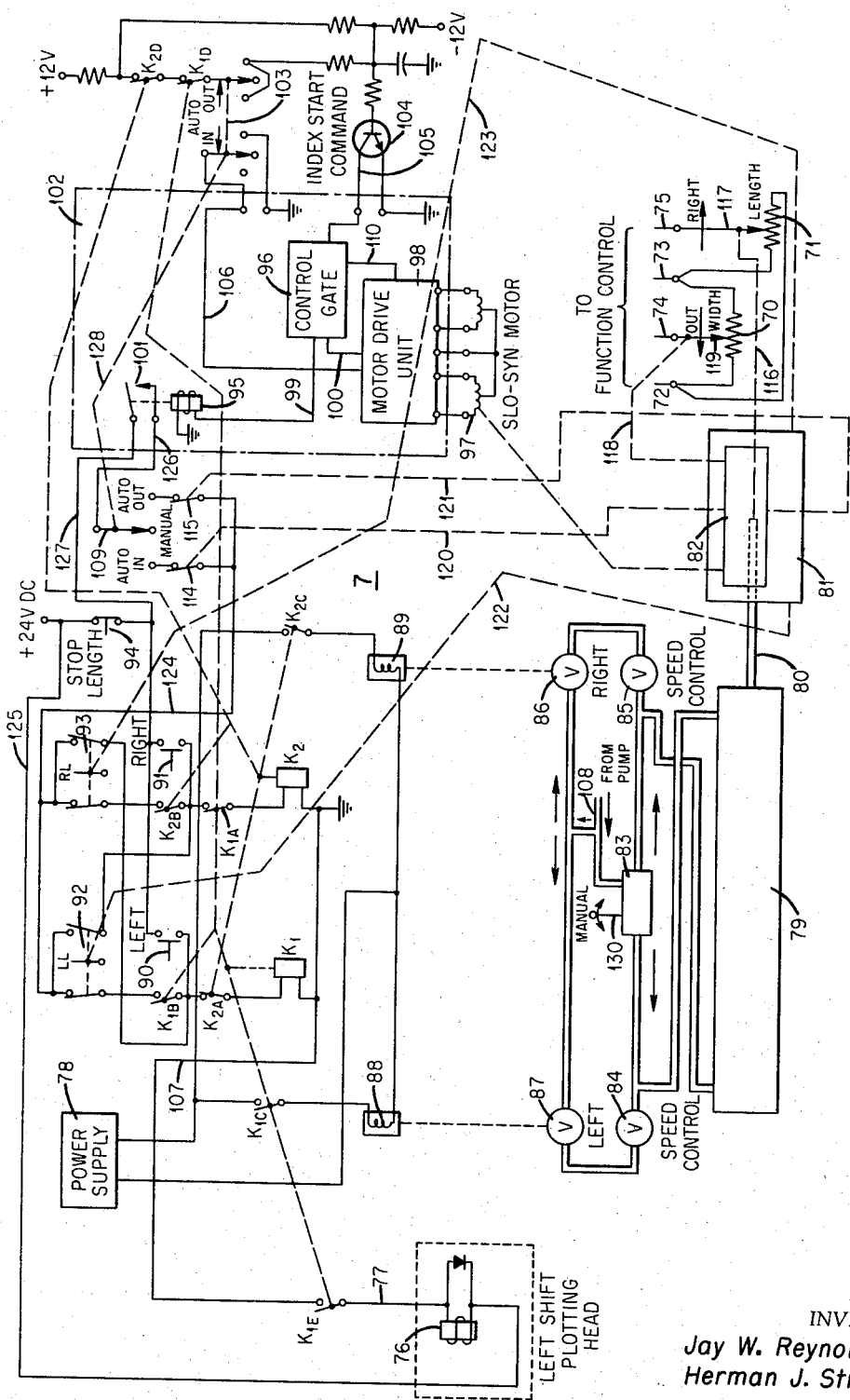
FIG. 3 is a schematic diagram of the scan control of FIG. 1.

The details of the function control unit 8 of FIG. 1 are shown in FIG. 2. The function control circuits of FIG. 2 select the operations to be performed by the gauging circuits of FIG. 4A and the zero detector and gate circuits of FIG. 4B, to be described below, through the use of twelve position detection circuits. Each position detection circuit contains two potentiometers 52, two voltage comparators 53, and an exclusive-OR gate 54. These outputs are then combined for the control functions over lines 62 through 69 which are the control inputs to the gauging circuits of FIGS. 4A and 4B. Each of the potentiometers 53 is a multiturn potentiometer, and a regulated power supply 51 supplies a negative voltage at one end of the potentiometers 52 and a positive voltage at the other end of the potentiometers 52. These same voltages are also routed to the location sensing "width" and "length" potentiometers 70 and 71 which are mounted on the scanner table and are also shown in FIG. 3, to be described below, through leads 72 and 73. The wiper arm 117 of length potentiometer 71 is connected through an emitter follower and a lead 75 to one input of the first eighteen comparators 53 of FIG. 2, and the wiper arm 119 of width potentiometer 70 is connected through an emitter follower and a lead 74 to one input of the last six comparators 53 of FIG. 2.

The length and width positions are set by the use of two potentiometers for each location and the "on" and "off" positions of each pair of potentiometers are preselected to provide a separate and distinct voltage range for each pair of potentiometers such that the voltages fed to the respective pairs of comparators 53 are utilized to sequentially switch the respective exclusive-OR gates 54 associated therewith, depending upon the positions of the wiper arms of the width and length potentiometers 70 and 71. The length positions are set, starting at the left, in the selected order: +30L, +10L, −10L, plate, maximum, minimum, −10R, +10R, and +30R, with the minimum within the maximum which is located within the plate length as seen in FIG. 5. The width positions, plate, maximum, and minimum, are located similar to the locations on the length scan. The functions of each of the locations +30L, +10L, −10L, −10R, +10R, and +30R, is to produce a control signal for the storage integrator circuits of FIGS. 1 and 4A. On the other hand, the function of the plate, maximum, and minimum locations, after combining the length and width positions to select an area, is to gate the inputs of the zero detectors of FIGS. 1 and 4B which are connected to the plotting head.

Right motion of the scanner will result in an increasing positive voltage at the wiper 117 of potentiometer 71 and this voltage is connected to the eighteen voltage comparators 53 for the length position detection as set forth above. Whenever this positive voltage to the comparator 53 exceeds the associated potentiometer 52 reference voltage, the output of the comparator will switch from −11 volts false to −3 volts true. In a similar manner, the width sensing potentiometer 70 is used to control the last six voltage comparators 53. The outputs of the on and off comparators are the inputs to an associated exclusive-OR gate 54. The associated gate 54 has a true output if the two inputs are different and a false output if the inputs are the same. The true output signal of a gate 54 is present during the time the scanner moves between the on and off positions as set by the reference voltage from each pair of associated potentiometers 52.

Figure 4A:
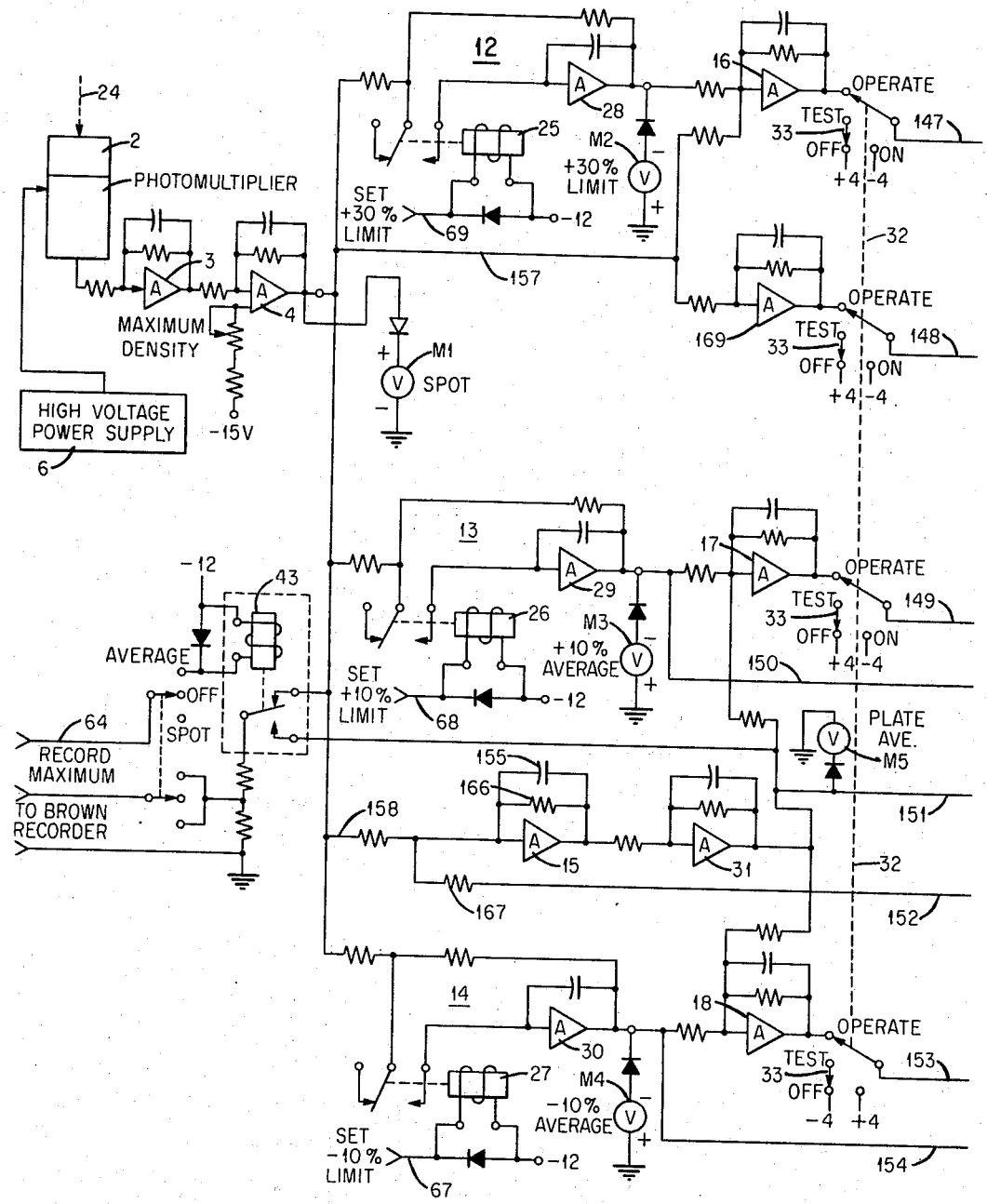
FIGS. 4A and 4B show a schematic diagram of the gauging circuits of FIG. 1.

The three setting signals, set +30% limit, set +10% limit, and set −10% limit as fed over lines 69, 68, and 67, respectively, to the setting relays 25, 26, and 27, respectively, of FIG. 4A, are generated by similar circuits. For instance, the +30L and +30R signals from the associated comparators 54 are combined in an "OR" gate 55, the +10L and +10R signals are combined in an OR gate 56, and the −10L and −10R signals are combined in an OR gate 57. The true output of each of the gates 55, 56, 57 is −3 volts while −11 volts is the false output. The output of each of the OR gates 55, 56, 57 controls a relay driver RD which in turn controls a setting relay, as set forth above, over lines 69, 68, and 67, respectively. The true output of each relay driver is for the setting relay to be operated.

Figure 4B:
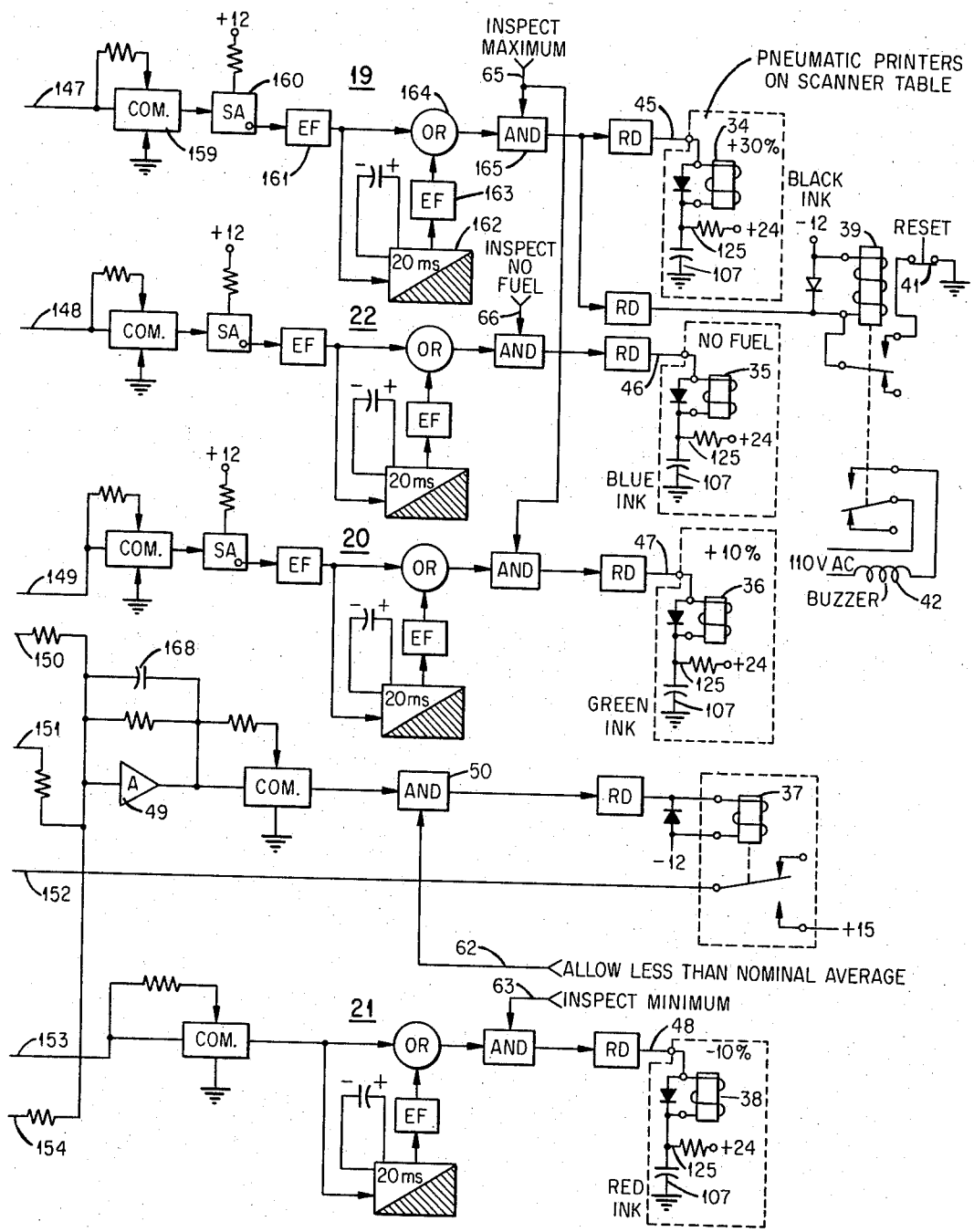

The signals from the plate, maximum, and minimum positions in length and width are combined to form inspect no fuel, inspect maximum, inspect minimum, allow less than nominal, and record maximum signals to the zero detector and gate circuits of FIG. 4B. Inspect maximum and inspect minimum are formed by combining the width and length signals in AND gates 59 and 60, respectively. The output of gate 59 is connected by a lead 65 to an AND gate of the unit 19 and to an AND gate of the unit 20 of the zero detector and gate circuits of FIG. 4B. Gate 59 is also connected to a relay driver RD which in turn is connected by means of a lead 64 to a selector switch 44 of FIG. 4A, as described below. In addition, the output of AND gate 59 is connected to an exclusive-OR gate 129 which combines the outputs of the plate area AND gate 58 and the maximum area AND gate 59 to provide the inspect no fuel signal over lead 66 to an AND gate of the unit 22 of FIG. 4B.

The true output of AND gate 60 is logically inverted in a squaring amplifier 61 and the output therefrom is connected by means of an emitter follower to provide the allow less than nominal signal over lead 62 which is connected to an AND gate 50 of FIG. 4B for the purpose to be described below. The inspect minimum signal which is the true output of AND gate 60 via squaring amplifier 61 and an emitter follower on lead 63 is connected to an AND gate of the unit 21 of FIG. 4B for the purpose to be described below.

The details of the scan control unit 7 of FIG. 1 are shown in FIG. 3 which will now be described. The longitudinal movement of a scanner table 81 is controlled by means of a push or pull rod 80 affixed thereto in any conventional manner, and the rod 80 is caused to be moved to the right or to the left by means of a hydraulic cylinder 79 in a conventional manner by means of a solenoid valve 86 or a solenoid valve 87, or by means of a manual lever 130 connected to a manual control unit 83. Hydraulic fluid is fed from a pump, not shown, through a line 108 to the unit 83, and to the electrically controlled solenoid valves 86 and 87. When valve 86 is opened by energization of its associated solenoid 89, hydraulic fluid will flow therethrough and through a speed control valve 85 to one end of cylinder 79 to cause movement of the rod 80 and table 81, affixed thereto, in one direction. When valve 87 is opened by energization of its associated solenoid 88, hydraulic fluid will flow therethrough and through speed control valve 84 to the other end of cylinder 79 to cause movement of rod 80 and table 81 in the opposite direction.

A power supply 78 is connected to one side of each of the solenoids 88 and 89. The other side of solenoid 88 is connected through a normally open contact $K_{1C}$ of relay $K_1$, when closed, to the other side of power supply 78. The other side of solenoid 89 is connected through a normally open contact $K_{2C}$ of relay $K_2$ when closed, to the other side of power supply 78.

It should be understood that the hydraulic means in FIG. 3 for the longitudinal translation of the scanner table 81 is not the only means that can be used for this purpose. For example, electric motor means may be substituted therefor, if desired, and the control means for the solenoid valves in FIG. 3 could then be used to control the electric motor means. A left pushbutton 90 and a right pushbutton 91 are provided for manual operation in either desired direction, when the switch arm 109 is in the manual position. Holding the desired pushbutton against its contacts will cause relay $K_1$ or $K_2$ to be energized for left or right motion, respectively. The switch arm 109 is mechanically coupled to two other switch arms by a coupling 128 and a coupling 103, whose purpose will be described below.

The scanner table 81 actuates through a mechanical coupling 122 the left limit switch contacts 92 which are in the control circuits of relays $K_1$ and $K_2$. The scanner table 81 also actuates through a mechanical coupling 123 the right limit switch contacts 93 which are also in the control circuits of relays $K_1$ and $K_2$.

A Slo-Syn preset index unit 102 controls a Slo-Syn motor 97 mechanically coupled to a plate holder 82 to provide transverse movement of the fuel plate holder 82, either "in" or "out" with respect to the scanner table 81 in a manner to be described below. The plate holder 82 is also mechanically coupled by means of a coupling 118 to the wiper arm 119 of the width potentiometer 70. The wiper arm 117 of the length potentiometer 71 is mechanically coupled by means of a coupling 116 to the table 81. The potentiometers 70 and 71 provide the position control voltages over lines 74 and 75 to the function control circuits of FIG. 2, as described above.

The plate holder 82 actuates through a mechanical coupling 120 limit switch contacts 114 when the holder 82 has been indexed "in" a predetermined amount after the fuel plate has been completely inspected. When the switch arm 109 is in the "automatic in" position, and after contact 114 is opened by the coupling 120, then a holding circuit for the relay $K_1$ or $K_2$, depending upon which is energized at the time, is broken and the inspection cycle is over. A new fuel plate is then placed on the holder 82, and contact arm 109 is switched to the "automatic out" position. The scanning of the new fuel plate is begun and continues until the plate holder 82 actuates through a mechanical coupling 121 limit switch contacts 115 whereby the holding circuit discussed above is again broken to stop operation of the device. The cycle is repeated for each subsequent fuel plate to be inspected.

The Slo-Syn preset index unit 102 is made by the Superior Electric Company, Model No. SP–250–4, and the Slo-Syn motor 97 is also made by the Superior Electric Company, Model No. SS–250–1002. A block diagram of the unit 102 is shown in FIG. 3. One output 99 of gate 96 controls the relay 95 such that when the scanner table 81 reaches one of the limit switches 92 or 93, the holding circuit to either relay $K_1$ or $K_2$, depending upon which is energized at the time, is broken by the associated limit switch contacts 92 or 93, and then both the contacts $K_{1D}$ and $K_{2D}$ are closed at this time to provide a circuit therethrough and through the manual-automatic in-out switch in either the "in" or "out" position thereof to the control transistor 104. The transistor 104 provides an "index start command" over lead 105 to the control gate 96, and the gate 96 deenergizes the relay 95 to open its contacts 101 in the holding circuits of relay $K_1$ or $K_2$. The second output 100 of gate 96 causes the motor 97 through the motor drive 98 to index the fuel plate holder 82 on the scanner table a preselected and predetermined amount where the direction of indexing is controlled by the position of the manual-automatic switch which does or does not connect ground (depending upon the position of the switch) to the lead 106 which is connected to the motor drive 98 which controls the motor 97. While the motor 97 is indexing the holder 82, the relay 95 is maintained deenergized such that neither of the relays $K_1$ or $K_2$ can be automatically energized to effect longitudinal movement of the scanner table while the plate holder is being indexed transversely. Upon completion of the transverse motion, the motor drive 98 resets the control gate 96 through lead 110 and allows relay 95 to be energized.

The sequence of operation of FIG. 3 is as follows: The scanning table 81 should be against a left or right limit switch and the fuel plate holder 82 should be against an out or in limit switch. Let it be assumed that the table is at the "left" switch and the holder is at the "in" switch with a fuel plate to be checked on the fuel holder. The scan of the fuel plate is started by turning the manual-automatic switch 109 to auto-out. A circuit is then completed from the 24-volt D.C. source, through normally closed pushbutton switch 94, through lead 127 to the closed contacts 101 on relay 95, the auto-out contact of switch 109, the out limit switch contacts 115, lead 124 to the normally open contact of the left limit switch 92, relay contcat $K_{1A}$, the relay $K_2$, and to ground. After relay $K_2$ is energized, contact $K_{2A}$ opens, thus preventing the energization of relay $K_1$, contact $K_{2C}$ closes, thus energizing the solenoid 89 to open the valve 86, thereby actuating the hydraulic cylinder 79 to cause the scanner table 81 to move to the right, contact $K_{2D}$ is opened, thus opening the control circuit to the index start command transistor 104, contact $K_{2B}$ closes providing a holding circuit for relay $K_2$ therethrough and through the closed contacts 93 of the right limit switch, through lead 124 and the out limit switch contact 115, through the automatic out position switch arm 109, through lead 126 and the now closed contacts 101 of relay 95, and through lead 127 and "stop length" pushbutton 94 to the 24-volt D.C. supply.

When the scanner table reaches the right limit switch 93, the normally open contact thereof will close. With the normally closed contact 93 opened, relay $K_2$ will be deenergized and longitudinal movement of the scanner table will be stopped since the circuit to the valve control solenoid 89 is now opened. Relay contact $K_{2D}$ closes before the normally open limit switch contact 93 closes, thus providing an index start command signal to gate 96 of unit 102 thereby deenergizing the relay 95 such that when the normally open contact 93 does close, the relay $K_1$ cannot be energized thereby as long as the relay 95 is deenergized. As pointed out above, the relay 95 is kept deenergized as long as the transversing indexing motor 97 is energized. When the motor 97 stops indexing, relay 95 is then energized to complete the circuit through its contacts to the relay $K_1$ as follows: from the 24-volt D.C. source, through normally closed switch 94, through lead 127 and now closed contacts 101 of relay 95, through lead 126 and switch arm 109 in the "auto-out" position, through the limit switch contact 115, through lead 124 and the now closed, normally open contact 93, through normally closed relay contact $K_{2A}$, and through relay $K_1$ to ground.

After relay $K_1$ is energized, relay contact $K_{1B}$ will provide a holding circuit for this relay therethrough, through the normally closed contact 92 of the left limit switch, through lead 124 and the limit switch contact 115, through switch arm 109, through lead 126 and the contacts 101 of relay 95, through lead 127 and the switch 94 to the 24-volt D.C. supply. Relay contact $K_{1D}$ is also opened to open the circuit to the index control transistor 104. In addition, relay contact $K_{1C}$ is closed to provide a closed circuit to the solenoid 88, thus opening the valve 87 to thereby effect movement of the scanner table 81 to the left. Also, contact $K_{1A}$, now opened, prevents energization of relay $K_2$ as long as relay $K_1$ is energized. Relay contact $K_{1E}$ is also now closed to complete a circuit from ground, through this contact and over lead 77 to a solenoid 76, and then over lead 125 to the 24-volt D.C. supply. The solenoid 76 is thus energized only when the scanner table 81 is being moved to the left and this solenoid is used to provide a physical shifting of the plotting head unit 11 to the left in order to provide an accurate position plotting of any out-of-tolerance markings on the plotting paper by the marking solenoids, thereby compensating for the inherent lag of the marking control means with all of the correction being effected in one direction, that is, to the "left."

The scanner table will move to the left until the left limit switch 92 is actuated to deenergize relay $K_1$, and the control unit 102 will again index the fuel plate holder 82 a predetermined amount, after which relay $K_2$ will again be energized to effect a movement of the table 81 toward the right limit switch 93. The motion sequence, right, index, left, index, right, etc., will continue until the out limit switch 115 is actuated. This will prevent the relay $K_1$ or $K_2$ from operating via the contacts 92 or 93 and the scanner will stop. Placing a new fuel plate on the holder 82 and moving the switch arm 109 to the "auto-in" position will cause the unit 102 to start the sequence for motion toward the limit switch 114 to thus begin a scanning operation for the new fuel plate to be inspected.

The gauging circuits of FIG. 4A and the zero detector and gate circuits of FIG. 4B will now be described. The circuits of these figures should be considered together with the respective common leads 147, 148, 149, 150, 151, 152, 153, and 154 of each figure to be taken as respective continuous circuit connections between the two figures.

The leads 62–69, inclusive, of FIG. 2 provide the various function input control signals to the gauging and zero detector and gate circuits of FIGS. 4A, 4B, as discussed above. The interconnections of the various units 2–5 and 12–22 of FIG. 1 are shown in more detail in FIGS. 4A and 4B. The spot, +30% limit, +10% average, −10% average, and plate average signals are displayed on the meters $M_1$, $M_2$, $M_3$, $M_4$, and $M_5$, respectively, for monitoring of the system.

As can be seen from the typical fuel plate 9 of FIG. 5, the area external to the maximum outline is the area where "no fuel" is tolerated. The area between the maximum outline and the minimum outline is the area where the spot fuel density up to +30% can be tolerated with a maximum of +10% average above nominal; therefore, the spot limit +30% and the +10% average limit are opened for this area. The area within the minimum outline is the area which is checked for ±10% average fuel density and a spot limit of +30%. It should be noted that the cross sectional area of the fuel in the plate can be a nonlienar shape.

As pointed out above, the zero detector and gate units 19, 20, 21, and 22 of FIG. 1 and FIG. 4B are opened in the following combinations: no fuel, +30% and +10%, and +30 and ±10% for the no fuel, maximum outline, and minimum outline, respectively. The spot or transmitted X-ray beam signal is obtained in the following manner: The transmitted X-ray beam 24 of FIG. 1 and FIG. 4 is absorbed in a plastic phosphor, not shown, that is coupled to a photomultiplier 2 operating with approximately 1000 volts on the dynode resistor string. The anode current is fed to the input of an operational amplifier 3, Dymec Model 2460A. The output of the amplifier 3 feeds the inuput of a level shifting amplifier 4. The current at the summing junction of amplifier 4 is combined with an adjustable bucking current to cause an increase in signal. The signal level at the output of the amplifier 4 is dependent upon the kv. and ma. settings of the X-ray machine, any filter material in the beam, the settings of the maximum density potentiometer, the operating voltage of the photomultiplier 2, and the fuel plate 9. The voltage level for 50 kv. at 8 ma. on the X-ray machine, an aluminum filter of approximately 150 mils, 1000 volts on the photomultiplier, and 6 mils of tool steel in the beam is +0.95 volt, and for 18 mils of tool steel in the beam is +7.60 volts. It should be understood that these voltage levels can be changed to correspond to other and different fuel plates with different density requirements other than those for which the present invention is being particularly described.

The spot signal from amplifier 4 is fed through line 156, the contacts of relay 25 when this relay is energized over line 69 from the function control circuit of FIG. 2, to the amplifier 28 of the storage integrator circuit 12, such that a transmitted signal from a +30% standard is stored therein. Relay 25 releases at the end of the set +30% limit signal. The output of amplifier 28 will remain at the level set except for a slow discharge due to leakage from the capacitor.

The stored +30% limit voltage from amplifier 28 is summed with the spot signal from amplifier 4 through leads 156 and 157 in the +30% spot check amplifier 16. The amplifier 16 compares the signal received from a +30% standard and a signal received from the fuel plate under inspection such that the output of the amplifier 16 is positive for a signal within tolerance and negative for an out-of-tolerance signal. The output of amplifier 16 is connected through an operate-test switch and a lead 147 to a zero detector and gate network 19 of FIG. 4B. The network 19 includes a comparator 159, a squaring amplifier 160, an emitter follower 161, a monostable multivibrator 162, an emitter follower 163, an OR gate 164, and an AND gate 165. The voltage comparator 159 is used to detect an out-of-tolerance condition. The output of the comparator 159 is standardized to true and false levels in the squaring amplifier 160 (Schmitt trigger) for the out-of-tolerance and in-tolerance signals, respectively. The squaring amplifier output drives a one-shot multivibrator 162 and one input of the OR gate 164. The second input of OR gate 164 is connected to the output of the multivibrator 162 through an emitter follower 163. The multivibrator 162 changes a narrow pulse from the comparator to the 20-ms.-wide pulse that is required to provide resolvable ink spots at the plotter at a scanning speed of 240 in./min. The output of OR gate 164 is connected to the AND gate 165 and gate 165 is gated by the inspect maximum signal over lead 65 from the function control circuit of FIG. 2. The output of AND gate 165 drives two relay drivers as shown in FIG. 4B. One of these relay drivers controls the +30% alarm circuit by energizing relay 39, which is locked in through an alarm reset pushbutton 41, and connects 110 volts A.C. across a buzzer 42. The other relay driver in the output of AND gate 165 energizes an air solenoid 34 mounted on the plotting head 11 of FIG. 1 and FIG. 6, through a lead 45. Solenoid 34 is connected through a lead 125 and a resistor to a 24-volt D.C. supply and through a condenser and a lead 107 to ground. When the +30% tolerance has been exceeded, the alarm circuit is actuated by the relay 39, and the air solenoid 34 will open a black ink marking channel on the plotting head 11 of FIG. 1 and FIG. 6 to provide an indication of this condition on the plotting paper 10 of FIG. 1. The position of such an indication on the paper 10 will correspond to the actual position in the fuel plate where the out-of-tolerance condition exists since the plotting head 11 is mechanically coupled to the fuel plate holder which holds the plate during an inspection operation.

The plate average signal is generated by routing the spot signal from amplifier 4 through leads 156 and 158 to an averaging amplifier 15, and then to an inverting amplifier 31. The RC time constant in the feedback path of amplifier 15 is determined by the amount of averaging desired and the particular scan speed used. In our case the time constant is determined from the formula: $RC=40/$ scan speed, where the scan speed is in inches per minute, R is the resistor 166 and it is fixed at 1 megohm, and C is the capacitor 155 in microfarads.

The output of the inverting amplifier 31 is used as one of the inputs to the $+10\%$ and $-10\%$ checking amplifiers 17 and 18, respectively, as an input to the plate average meter $M_5$, and as an input to a hold-nominal average amplifier 49. The signals from the $+10\%$ and $-10\%$ limit amplifiers 29 and 30 and the average inverting amplifier 31 are summed in the hold amplifier 49. Unity gain is used for the $\pm 10\%$ inputs and a gain of two is used for the inverted plate average input. The resulting output is zero volts if the plate average is near-nominal, a negative voltage if the plate average is above-nominal, and a positive voltage if the plate average is below-nominal. In the area between the maximum and minimum fuel outlines, a voltage comparator connected to the output of amplifier 49 checks for a below-nominal signal. The detection of the below-nominal signal causes a relay 37 to be energized through an AND gate 50 and a relay driver, thereby connecting a $+15$-volt signal via the contacts of relay 37 and through a line 152 and a resistor 167 to the input of the averaging amplifier 15. The resulting shift in the negative direction of the output of the hold amplifier 49 turns off the feedback. The periodic nature of the output of the hold amplifier 49 can be changed by varying the size of the resistor 167 and a condenser 168. Thus, the hold-nominal average amplifier 49 is utilized to insure a nominal average output while the fuel plate is being inspected in the area between the maximum outline and the minimum outline. The AND gate 50 turns off the hold-nominal circuit through the line 62 from the function control of FIG. 2 when the X-ray beam is within the minimum outline of the fuel plate.

The $+10\%$ average check is similar to the $+30\%$ spot check as described above. When relay 26 is energized through the line 68 from the function control circuit, the amplifier 29 of the unit 13 receives a signal from the $+10\%$ standard and the signal as integrated by the unit 13 is stored. The check amplifier 17 sums the signals from the set-and-hold amplifier 29 and the inverting amplifier 31. The output of amplifier 17 is positive for a within-tolerance signal and negative for an out-of-tolerance signal. The circuit from the amplifier 17 to its associated air solenoid 36 is by means of a zero detector AND gate unit 20 and this unit operates in the same manner as the $+30\%$ spot check unit 19 as described above. The inspect maximum signal from the function control over line 65 also opens the AND gate of unit 20 such that the air solenoid 36 is operated through the line 47 for an out-of-tolerance signal. The solenoid 36 opens a green ink channel in the plotting head 11 of FIG. 1 and FIG. 6.

The $-10\%$ average check is the same as the $+10\%$ with one exception. The out-of-tolerance signal is positive and the within-tolerance signal is negative; therefore, an inverter squaring amplifier is not required to standardize the comparator output of unit 21. The amplifier 30 of unit 14 stores a signal from the $-10\%$ standard when the relay 27 is energized by line 67 from the function control unit. The check amplifier 18 sums the signals from the amplifiers 30 and 31. An out-of-tolerance signal from amplifier 18 is fed through the network 21 and lead 48 to an air solenoid 38 when the AND gate of network 21 is opened by a signal through lead 63 from the function control unit. The solenoid 38 opens a red ink channel in the plotting head 11 of FIG. 1 and FIG. 6.

The zero detector and gate unit 22 of the no fuel checking channel operates in the same manner as the $+30\%$ spot check unit 19. The spot signal from amplifier 4 is fed through lines 156 and 157 to an amplifier 169. The reference point for this channel is ground, and the within-tolerance and out-of-tolerance signals are positive and negative, respectively. An out-of-tolerance signal from amplifier 169 is fed through the network 22 and a lead 46 to an air solenoid 35 when the AND gate of unit 22 is opened by a signal through line 66 from the function control unit. The solenoid 35 opens a blue ink channel in the plotting head 11 of FIG. 1 and FIG. 6.

The switch arms of an operate-test switch are ganged together by a mechanical connection 32, and this switch allows any of the limits ($+30\%$, $\pm 10\%$, and no fuel) to be tested through its associated test switch 33.

A relay 43 selectively connects the spot or average signal to a recorder depending upon the position of the selector switch 44 and a control signal through lead 64 from the function control unit. The spot or average signal displayed on the recorder is not used during normal scanning of 240 in./min.

Figure 6:
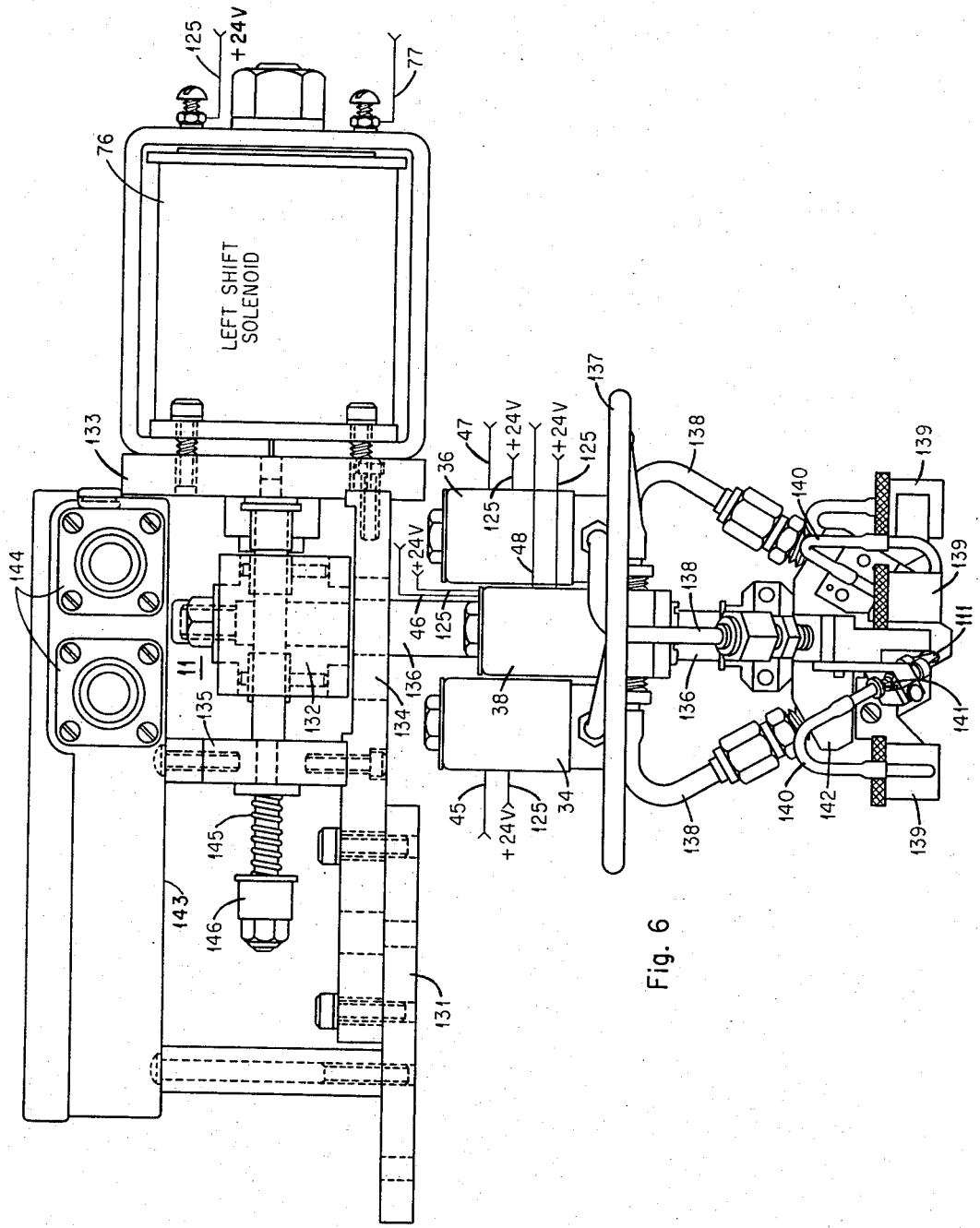
FIG. 6 shows a part of the details of the plotting head of FIG. 1.

Part of the details of the plotting head 11 of FIG. 1 are shown in FIG. 6. Physically, the printer is a grouping of air brushes so arranged as to point at a common spot in space (in practice, a spot on the chart paper). Each air brush is controlled by a solenoid valve placed in its air supply line. Also, each air brush has its own ink reservoir so that each can have its own distinctive color. Mounting brackets 133, 134, and 135 support a member 132 in such a manner that the member 132 is slidably supported by the brackets 133 and 135. When the left shift solenoid 76 is energized through lead 77 and the voltage supply lead 125, the support member 132 is shifted to compress a spring 145 held by a stop nut 146 such that when the solenoid 76 is deenergized, the spring 145 will return the member 132 to its original position. A bracket member 143 supports two plug-in connectors 144 for connecting the input control leads to the plotting head 11.

A mounting bracket 131 is affixed to the bracket 134, and the bracket 131 is mechanically connected to the fuel plate holder 82 of FIG. 3 by means, not shown, such that the movements of the plate holder are duplicated by the plotting head 11, as described above.

The support member 132 supports a vertical rod 136 which in turn supports the four air solenoid valves 34, 35, 36, and 38 of FIG. 4B, and their associated ink marking devices. Only the solenoid valves 34, 36, and 38 are shown in FIG. 6, and the solenoid valve 35 is mounted directly back of the solenoid valve 38, with the voltage supply lead 125 and the signal control lead 46 connected thereto. Leads 125 and 48 are connected to solenoid valve 38, leads 125 and 47 are connected to solenoid valve 36, and leads 125 and 45 are connected to solenoid valve 34.

A source of air pressure, not shown, is connected to the solenoid valves 34, 35, 36, and 38 by means of a supply tube 137, and the air pressure at the plotting head is set at 20 to 30 pounds per square inch. Four ink reservoirs 139 are provided for respectively containing the black ink, blue ink, green ink, and red ink supplies associated with the respective air solenoid valves 34, 35, 36, and 38. An ink-feed support unit 142 provides for four ink channels each directed to a common opening at the bottom of unit 142 which opening is positioned adjacent the plotting paper 10 of FIG. 1, and these four channels are connected to the respective ink reservoirs 139 by means of the respective tubings 140. An adjusting means 141 is provided for controlling the amount of ink supplied through a needle valve 111 on each channel.

When one of the solenoid valves 34, 35, 36, or 38 is energized by an out-of-tolerance signal, as described above, then the energized valve will open to connect the source of air pressure through an associated tubing 138 to effect withdrawal of ink from the associated ink reservoir 139 through the associated tubing 140 and adjusting means 141 to effect a marking on the plotting paper 10 of FIG. 1. The color of the ink and position on said paper are indicative of the inspection results at the corresponding location on the fuel plate under inspection. The inks used in the reservoirs 139 are a stamp-pad type and they may need to be filtered through a lintless nylon cloth before use in the device of FIG. 6.

From the above detailed description it can be seen that the fuel plate inspection system thus involves injecting data from standards into circuitry for comparison with data derived from the fuel plate itself, with a result that areas of out-of-tolerance are indicated on a chart. The width of the standards in the longitudinal direction of the plate holder is not critical except as may be required to provide satisfactory averaging as each one passes between the radiation source and the detector. For example, one and one-half inch is a typical width for the standards. The dimension of the standards in the transverse direction corresponds to the width of the fuel region of the fuel plate under inspection.

The use of a series of standards at each end of the fuel plate permits inspection of the fuel plate in one longitudinal direction, and after an incremental transverse indexing movement of the plate holder at the end of the longitudinal translation stroke, inspection of the fuel plate is made in the opposed longitudinal direction, thus minimizing the time required for a complete inspection of the fuel plate. The number of transverse incremental indexings for a complete inspection of a fuel plate is about 50 for a typical fuel plate, and, of course, the total number of these indexings depends upon the width of the fuel plate to be inspected. Each of these incremental indexings may be about 60 mils, with an X-ray beam diameter of 80 mils at the surface of the fuel plate, for example.

It should be understood that the above-described invention is not limited to the inspection of reactor fuel plates with the specifically set forth fuel tolerance limits. For example, the tolerance in the maximum fuel area of the plate may be no spot within this area more than a selected amount from 25% to 30% in excess of that desired and on an average nothing outside of a selected amount from +10% to +15% of the desired amount; and the tolerance in the minimum fuel area of the plate may be no spot within the last-named area more than a selected amount from 25% to 30% in excess of that desired and on an average no amount greater than a selected amount from ±10% to ±15% in excess of the desired amount. The above ranges are given as examples only and any tolerance limits desired may be used depending upon the fuel distribution within the plate to be inspected. Of course, the standards would have to be standardized to to the particular plate to be inspected.

This invention has been described by way of illustration rather than by way of limitation and it should be understood that the present invention is equally applicable in fields other than those described.

What is claimed is:

1. A method for the non-destructive inspection of a nuclear reactor fuel plate provided with an area where no fuel is tolerated, a maximum fuel area, and a minimum fuel area, comprising the steps of sequentially passing a plurality of standards, each corresponding to one of said different areas, between a radiation source and a radiation detector, deriving a first output signal for each of said standards from said detector and sequentially storing each of said output signals, sequentially passing said areas of said fuel plate between said source and said detector, deriving a second output signal for each of said areas proportional to the fuel concentration in each of said areas, sequentially comparing said first output signal with said second output signal for each of said areas and its associated standard, sequentially providing a third output signal for each of said comparisons, each of said third output signals being indicative of any out-of-tolerance fuel concentration for each of said areas, said passing of said standards and fuel plate between said source and said detector constituting one longitudinal pass therebetween, indexing transversely said standards and plate a predetermined increment, passing said standards and said fuel plate between said source and said detector in an opposite longitudinal pass between said source and said detector, and repeating said one longitudinal pass, indexing, and opposite longitudinal pass steps until said fuel plate is completely inspected, and providing said third output signals as indications of any out-of-tolerance fuel concentration in any of said respective areas during any of said longitudinal inspection passes.

2. The method set forth in claim 1, wherein the tolerance in said maximum fuel area of said plate is no spot within this area more than a selected amount from 25% to 30% in excess of that desired and on an average nothing outside of a selected amount from +10% to +15% of the desired amount, and the tolerance in said minimum fuel area of said plate is no spot within this last-named area more than a selected amount from 25% to 30% in excess of the desired amount and on an average no amount greater than a selected amount from ±10% to ±15% in excess of the desired amount.

3. The method set forth in claim 1, wherein the tolerance in said maximum fuel area of said plate is no spot within this area more than 30% in excess of that desired and on an average nothing outside of +10% of the desired amount, and the tolerance in said minimum fuel area of said plate is no spot within this last-named area more than 30% in excess of the desired amount and on an average no amount greater than ±10% in excess of the desired amount.

4. An improved system for the non-destructive inspection of a nuclear reactor fuel plate provided with an area where no fuel is tolerated, a maximum fuel area, and a minimum fuel area, comprising a scanner table; a fuel plate holder mounted on said table, said plate holder being adapted to hold said fuel plate to be inspected; a plurality of standards, each corresponding to one of said different areas, positioned at one end of said plate and on said plate holder; an identical group of said standards positioned at the other end of said plate and on said plate holder; a source of radiation provided with a collimating means for producing a collimated beam of radiation; a radiation detector means positioned for receiving said collimated radiation beam; scan control means coupled to said scanner table for passing said standards and said fuel plate between said radiation source and said detector means in one longitudinal pass, said scan control means further including transverse incremental indexing means for indexing said fuel plate holder transversely with respect to said scanner table at the end of said one longitudinal pass, and including further means, after indexing, to pass said standards and said fuel plate in an opposite longitudinal pass between said source and said detector means, and to repeat said longitudinal passing and indexing cycles until said entire fuel plate has passed between said radiation source and detector means; a length potentiometer actuated by said scanner table and a width potentiometer actuated by said fuel plate holder; a function control network; said length potentiometer and width potentiometer providing variable control voltages to said function control network; a plurality of gauging circuits connected to the output of said radiation detector means; said function control network providing a plurality of sequential gating signals to said gauging circuits; said gauging circuits including a no fuel checking channel, a maximum fuel checking channel, and minimum fuel checking channels; amplifier means coupled between said detector means and said checking channels of said gauging circuits; said maximum fuel checking channel and minimum fuel checking channels each including a storage integrator circuit, a summing amplifier, and a zero detector and gate unit connected in series; said no fuel channel including a zero detector and gate unit; said storage integrator circuits being sequentially opened as controlled by said function control unit coupled thereto to sequentially and respectively store the signals received from said respective standards as they pass between said source and said detector means; said summing amplifiers comparing said stored signals with the signals subsequently and sequentially received by said summing amplifiers from said detector means when said fuel plate passes between said source and said detector means; said zero detector and gate units being sequentially opened by said function control unit coupled thereto; a plotting head mechanically coupled to said fuel plate holder for duplicating all movements imparted thereto; a stationary plotting paper mounted adjacent to said plotting head for receiving a plotting indication therefrom; a plurality of air solenoids and a like number of ink marking channels connected to a common opening and associated with and controlled by said respective solenoids and being mounted on said plotting head, each of said channels being provided with a different color ink; and means connecting the outputs of said respective zero detector and gate units to respective ones of said air solenoids, whereby any out-of-tolerance signal received from any one of said zero detector and gate units will actuate its associated air solenoid and ink marking channel to effect a marking on said plotting paper of such a condition, the color of ink indicating which out-of-tolerance condition exists and the position of any such marking on said paper indicating the position within said fuel plate at which this condition exists.

5. The system set forth in claim 4, wherein the tolerance in said maximum fuel area of said plate is no spot within this area more than a selected amount from 25% to 30% in excess of that desired and on an average nothing outside of a selected amount from +10% to +15% of the desired amount, and the tolerance in said minimum fuel area of said plate is no spot within this last-named area more than a selected amount from 25% to 30% in excess of the desired amount and on an average no amount greater than a selected amount from ±10% to ±15% in excess of the desired amount.

6. The inspection system set forth in claim 4, wherein each group of standards mounted at each end of said fuel plate on said fuel holder includes a +30% standard, a +10% standard, and a −10% standard; said signals, received from said detector means from said +30% standard and from said fuel plate, being fed, respectively, into said storage integrator circuit of said maximum fuel checking channel and into said summing amplifier of said maximum fuel checking channel for comparison of said standard signal with said fuel plate signal; said minimum fuel checking channels including a +10% checking channel and a −10% checking channel, said storage integrator circuit of each of the +10% and −10% checking channels receiving a signal from said detector means from said +10% and −10% standards, respectively; an average amplifier coupled to the output of said detector means through said amplifier means; and means for coupling the output of said average amplifier to the respective summing amplifiers of said +10% and −10% checking channels to compare the signals received from the storage integrator circuits thereof with the respective signals received from said fuel plate during any one of said longitudinal passes of said standards and fuel plate between said source and said detector means.

7. The inspection system set forth in claim 6, wherein said source of radiation is an X-ray machine, and said radiation detection means is a photomultiplier.

8. The inspection system set forth in claim 6, wherein said scanner table is coupled to a hydraulic cylinder; a pair of electrically controlled valve means and a source of hydraulic fluid pressure coupled to said cylinder; a left limit switch and a right limit switch for actuation by said scanner table when it is moved to the left or to the right by said hydraulic cylinder; a first control relay in a circuit with said right limit switch; a second control relay in a circuit with said left limit switch; said respective control relays respectively controlling said electrically controlled valve means to thereby effect movement of said scanner table to the right and then to the left; transverse incremental indexing motor means coupled to said fuel plate holder, and means actuated by either pair of said relay control means when one of said limit switches is actuated to effect a preselected indexing of said plate holder by said motor means before further longitudinal translation of said scanner table is effected by said hydraulic cylinder, said hydraulic cylinder control means and motor indexing means effecting a longitudinal stroke of said table and plate holder to the right, transverse incremental indexing of said plate holder, a longitudinal stroke of said table and plate holder to the left, transverse incremental indexing of said plate holder, a longitudinal stroke of said table and plate holder to the right, etc., until said entire fuel plate has been inspected; and a pair of start pushbuttons in circuit with a D.C. source of supply, with one each of said pushbuttons connected to a respective one of said control relays, said D.C. source also providing operating power to one of said relays through a holding circuit including D.C. source, the limit switch associated with that relay and a relay contact of said one relay, and a similar holding circuit being provided for the other control relay when the other relay is energized.

9. The inspection system set forth in claim 8, and further including an "out" limit switch and an "in" limit switch actuated by said fuel plate holder depending upon the direction of indexing being effected by said motor means; a first selector switch having a manual position, an automatic out position, and an automatic in position, said selector switch in either its automatic out or automatic in position connecting the associated out or in limit switch contact in one of said holding circuits for the control relay that is energized at the time, such that said motor indexing means will continue to provide a series of indexing cycles to said fuel plate holder between said longitudinal strokes until one of said in or out limit switches is actuated depending upon the direction of indexing; and a second automatic in-automatic out selector switch mechanically coupled to said first selector switch, said second selector switch in its respective out and in positions selectively controlling the direction of indexing effected by said motor means to said fuel plate holder toward said out limit switch and toward said in limit switch, respectively, whereby said fuel plate under inspection is moved from one of the out-in limit switches toward the other out-in limit switch until the other out-in limit switch is actuated to thus open the holding circuits for both control relays to terminate the inspection of said fuel plate, and whereby by moving the two automatic out-automatic in selector switches to their other automatic positions, the subsequent inspection of another fuel plate may be effected.

10. A system for the non-destructive inspection of a plate having different areas with each area having an area density requirement different from the other areas, comprising a plurality of standards, each corresponding to one of said different areas; a source of radiation provided with a collimating means for producing a collimated beam of radiation; a radiation detector means positioned for receiving said collimated radiation beam; means for passing said standards and plate between said source and detector means in one longitudinal direction, for indexing said standards and plate transversely a preselected increment after said one longitudinal pass, for passing said standards and plate between said source and detector means in the opposite longitudinal direction after indexing, and said last-named means repeating said passing and indexing cycles until said plate has been completely inspected by said collimated radiation beam and detector means, said detector means providing for each longitudinal pass a first output signal for each of said standards proportional to the area density thereof, said detector means providing a second output signal for each of said areas of said plate proportional to the area density thereof; respective means for sequentially comparing said first output signal with said second output signal for each of said standards and its associated plate area and producing a third output signal for each of said comparisons for any out-of-tolerance density that may exist for any of said plate areas; and respective indicating means coupled to said respective comparing means and being actuated by said respective third output signals for thereby indicating any out-of-tolerance density existing in each respective area of said plate.

11. The inspection system set forth in claim 10, wherein said indicating means includes a plotting head, a plurality of air solenoids and respective different ink color marking channels associated therewith mounted on said plotting head, said plotting head being mechanically coupled to said means for passing and indexing said plate to duplicate movement of said plate, a stationary plotting paper mounted adjacent to said movable plotting head for receiving plotting information from said head, and means for connecting said third output signals from said respective comparators to respective ones of said air solenoids to thereby effect a different ink color marking on said paper of any out-of-tolerance density for each of said areas of said plate under inspection.

12. The inspection system set forth in claim 11, wherein said plate is a reactor fuel plate, said different areas including an area where no fuel is tolerated, a maximum fuel area, and a minimum fuel area, said system further including a no fuel checking channel connected to the output of said detector means, and an associated air solenoid and ink marking channel connected to the output of said no fuel checking channel and mounted on said plotting head.

13. The system set forth in claim 12, wherein the tolerance in said maximum fuel area of said plate is no spot within this area more than a selected amount from 25% to 30% in excess of that desired and on an average nothing outside of a selected amount from +10% to +15% of the desired amount, and the tolerance in said minimum fuel area of said plate is no spot within this last-named area more than a selected amount from 25% to 30% in excess of the desired amount and on an average no amount greater than a selected amount from ±10% to ±15% in excess of the desired amount.

14. The system set forth in claim 12, wherein said standards are a +30% standard, a +10% standard, and a −10% standard.

15. The system set forth in claim 14, wherein said source of radiation is an X-ray machine, and said detector means is a photomultiplier.

References Cited

UNITED STATES PATENTS

| | | |
|---|---|---|
| 2,907,883 | 10/1959 | Jacobs et al. |
| 2,992,332 | 7/1961 | Madigan. |
| 3,024,363 | 3/1962 | Strandell. |
| 3,082,323 | 3/1963 | Chope et al. _____ 250—83.3 |
| 3,106,640 | 10/1963 | Oldendorf _____ 250—52 |

RALPH G. NILSON, *Primary Examiner.*

WILLIAM F. LINDQUIST, *Examiner.*

S. ELBAUM, *Assistant Examiner.*